United States Patent
Pomeroy

(10) Patent No.: US 8,424,237 B2
(45) Date of Patent: Apr. 23, 2013

(54) ANGLING RIG

(76) Inventor: Simon Alexander Pomeroy, Devon (GB)

(*) Notice: Subject to any disclaimer, the term of this patent is extended or adjusted under 35 U.S.C. 154(b) by 0 days.

(21) Appl. No.: 13/084,846

(22) Filed: Apr. 12, 2011

(65) Prior Publication Data

US 2011/0252690 A1    Oct. 20, 2011

Related U.S. Application Data

(62) Division of application No. 10/545,476, filed as application No. PCT/GB2004/000479 on Feb. 11, 2004, now abandoned.

(30) Foreign Application Priority Data

| Feb. 12, 2003 | (GB) | ................................. | 0303146.5 |
| Mar. 21, 2003 | (GB) | ................................. | 0306446.6 |
| Nov. 26, 2003 | (GB) | ................................. | 0327489.1 |

(51) Int. Cl.
*A01K 91/00* (2006.01)

(52) U.S. Cl.
USPC .......... 43/44.9; 43/44.96; 43/44.97; 43/43.12

(58) Field of Classification Search ............. 43/44.9, 43/44.96, 44.97, 43.12, 44.87, 43.1
See application file for complete search history.

(56) References Cited

U.S. PATENT DOCUMENTS

| 3,096,599 A | 7/1963 | Baron |
| 3,196,575 A | 7/1965 | Kotis |
| 3,273,278 A | 9/1966 | Lynch |
| 3,744,177 A | 7/1973 | Cron, Jr. |
| 3,782,025 A | 1/1974 | Kochevar |
| 3,982,350 A | 9/1976 | Heckathorn |
| 4,389,805 A | 6/1983 | Hargrave |
| 4,949,645 A | 8/1990 | Hayward et al. |
| 5,142,811 A | 9/1992 | Freeman |
| 5,457,909 A | 10/1995 | Graves |
| 6,073,386 A | 6/2000 | Firmin |
| 6,076,297 A | 6/2000 | Lippincott |
| 6,745,511 B1 | 6/2004 | Falconer |

FOREIGN PATENT DOCUMENTS

| DE | 3728581 A1 | 3/1989 |
| EP | 0882396 A1 | 12/1998 |
| GB | 2204771 A | 11/1988 |
| GB | 2317800 A | 4/1998 |
| GB | 2325135 A | 11/1998 |

*Primary Examiner* — Christopher P Ellis
(74) *Attorney, Agent, or Firm* — Arthur Jacob

(57) ABSTRACT

An angling rig comprises a pebble of natural stone and, secured to the pebble, an attachment ring for attaching the pebble to a fishing line. The attachment ring is secured to the pebble by means of a swivel bonded by epoxy resin adhesive in a bore formed in the pebble. The invention provides an alternative to a lead weight which is non-toxic (and therefore ecologically desirable) and also of natural form (and therefore not perceived as threatening by fish), whereby anglers may both help the environment and expect better catches.

18 Claims, 2 Drawing Sheets

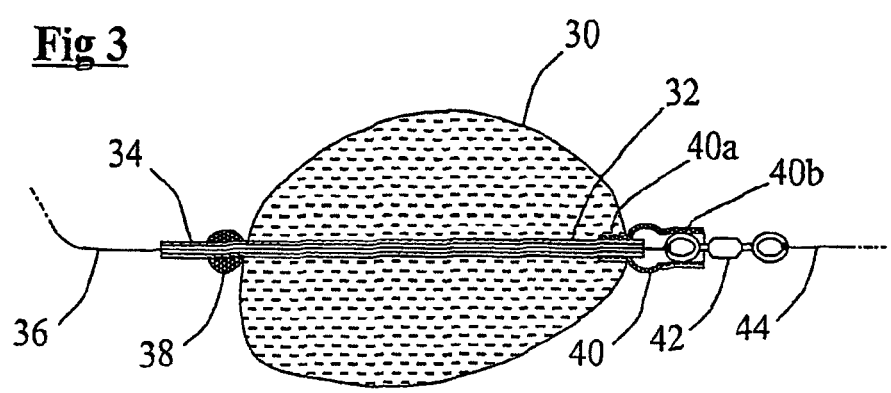
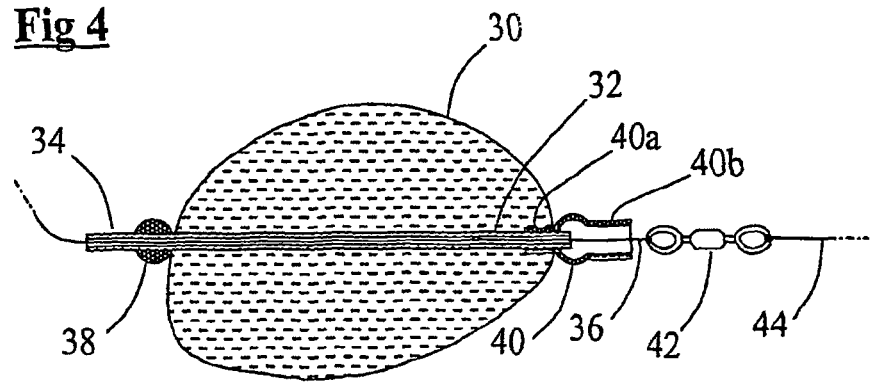

ANGLING RIG

This application is a division of application Ser. No. 10/545,476, filed Aug. 11, 2005.

This invention concerns angling rigs including weights to be attached to fishing lines for use by anglers.

For centuries, anglers' weights have conventionally been made of lead. Lead is heavy, it is readily available and it is easily cast or moulded into the form of a weight. But lead is toxic and therefore environmentally hazardous, and its resistance to corrosion means this hazard is long-term. At the same time, lead is palpably not a natural material in the fishing environment. Thus its use, although almost universal, is considered by serious anglers to reduce their catches because fish, which learn by association, come to perceive danger when they see lead. Nevertheless, despite widespread environmental concern, and dissatisfaction among anglers, no general replacement for lead has emerged.

It follows that there is a long-felt want for an angling rig using a weight which is environmentally friendly and also not perceived as dangerous by fish, and it is an object of the present invention to satisfy that want.

Thus, according to the invention there is provided an angling rig comprising a pebble of natural stone and attachment means through which in use a fishing line extends and is thereby attached to the pebble.

Those skilled in the art will readily appreciate the benefits of natural stone. The pebble is natural both intrinsically and extrinsically—indeed, most if not all angling areas include pebbles. Thus, use of the invention as a replacement for rigs using lead weights means that angling areas will not be polluted by extraneous and hazardous material. Natural stone will not appear to fish as representing danger—both because it will be camouflaged and because, being less dense than lead, it will settle more gently in the water—so anglers can expect better catches. And when weights are lost, which is inevitable from time to time, they will become part of the environment if of natural stone, and support the growth of algae etc. It will also be noted that all these benefits will be most pronounced in waters which are most heavily fished, being waters which are most exposed to lead accumulation and where fish are most wary of the appearance of lead.

In one embodiment of the invention the attachment means comprises an attachment ring secured to the pebble. This provides an easy and reliable means of attachment to a fishing line, in contrast with devices tried by small boys since time immemorial and with the use of an elastic band proposed in U.S. Pat. No. 3,982,350. The attachment ring may be secured to the pebble by means of a swivel, which may have a first part holding the attachment ring and a second part retained in a bore in the pebble, which use of a swivel allows the weight to be used with many common kinds of angling rig. The second part of the swivel may be fixed in said bore by a bonding agent such as a two-part epoxy resin adhesive, preferably one which cures to a water-resistant and substantially odourless state so as not to alert fish. A layer of sand may be arranged to cover the mouth of the bore, held in place by the bonding agent.

In another embodiment of the invention the pebble is formed with a bore through which a said fishing line extends in use and the attachment means is configured and arranged for loosely attaching the pebble to the line. (In this context the term "loosely attaching" as used herein refers to rigs permitting either of the aforementioned variants, and more particularly to such rigs in which the strength of attachment of the weight to the line is less than the breaking strength of the line and may be substantially zero whilst nevertheless preventing the weight from running off the end of the line, so that the rig may be both cast and retrieved without losing the weight). This form of rig preferably includes an anti-tangling tube extending through said bore and providing a substantially free path therethrough for the line. The anti-tangling tube may be retained in the bore by two beads friction-fitted over the tube at opposite ends of said bore. Preferably one of these beads is a tulip bead having its stem extending into the bore. A trace swivel may be provided with one end configured and arranged to be releasably held in the cup of the tulip bead, and in use a trace with a hook may be tied to the other end of the trace swivel.

Preferably the pebble is not soluble in water. This allows it to be used again and again, for economy and to enable an angler to select a particular weight for particular circumstances.

The invention extends to a method of making an angling rig comprising forming a bore in the pebble and locating in the bore attachment means configured and arranged to be received in the bore and to receive a fishing line extending through the attachment means. The bore may be formed by a drill bit having a spear tip of tungsten carbide, which bit is preferably lubricated whilst forming the bore.

Other aspects of the invention will be apparent from the following description, which is made by way of example only with reference to the accompanying schematic drawings in which—

FIG. 3 is a cross-section of a second angling rig according to the invention; and FIG. 4 is a view corresponding to FIG. 3 and illustrating the effect of catching a fish.

Figure 1:
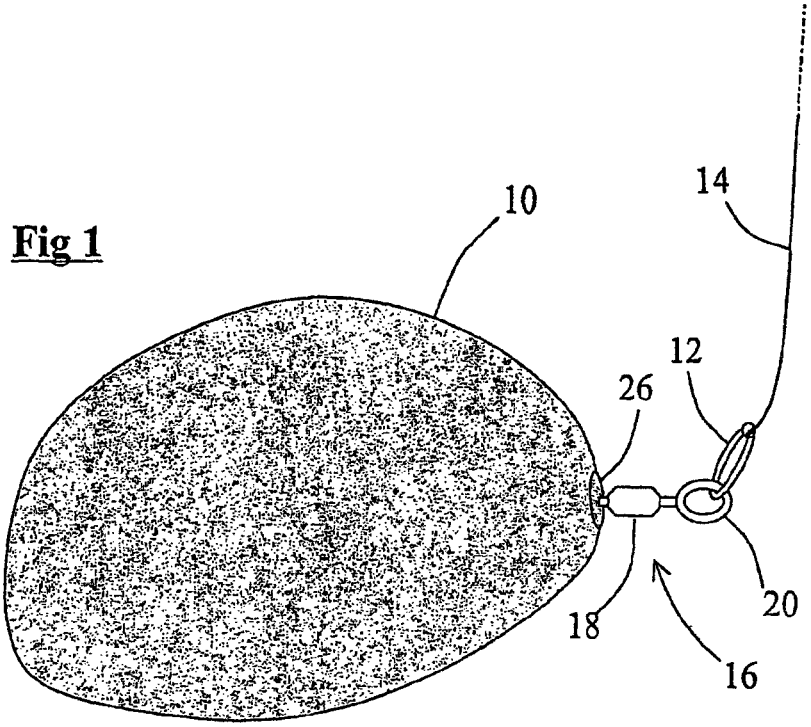
FIG. 1 is an enlarged view of a first angling rig according to the invention.

Referring first to FIG. 1, the angling rig shown therein comprises a pebble 10 and, secured to the pebble 10, an attachment ring 12 to which, in the simplest use of the invention, a fishing line 14 is tied (by means well known, such as a blood knot). The pebble is of the kind known as a northern cobbler and is conveniently of the size known as 20-30 (which is to say that its major axis has a dimension between 20 mm and 30 mm).

The attachment ring 12 is secured to the pebble 10 by means of a swivel 16 bonded in the pebble as will now be described in more detail with reference to FIG. 2. The swivel 16 is of common form, having a pair of retaining rings connected together to be mutually rotatable by means of a barrel 18. One retaining ring 20 holds the attachment ring 12, loosely, for flexibility—such assembly of swivel 16 and attachment ring 12 being commonly known as a flexi-ring swivel. (Flexi-ring swivels are widely available from a variety of suppliers). Whilst the swivel 16 would normally have at its other end another ring matching the retaining ring 20, by the present invention this other ring is cut to form a pair of short legs 22 which fit within a bore 24 formed in the pebble 10.

For a Size 10 flexi-ring swivel, the bore 24 is 3 mm diameter and 5 mm deep and may be formed by means of a glass drill operated at low speed (8.600 rev/min) with water lubrication. A suitable bit is the FAI GD3 glass bit, which is a bit having a tungsten carbide spear point of 3 mm working diameter and is available from Faithful! Tools of Dartford, UK. Alternatively a core bit of similar working diameter may be used.

The legs 22 are bonded in the bore 24 by means of a two-part epoxy resin adhesive which is substantially odourless and water-resistant when cured. "Adhesiveweld" adhesive from the JB Weld Company of Slough, UK, is suitable. Equal amounts of the two parts of the adhesive, ie resin and hardener, are mixed together and the mixture then pressed into the bore 24 partially to fill it. The swivel 16 is then inserted in the bore 22, causing the adhesive to come up to the mouth of the bore 22, where it is now covered by a coating 26 of fine sand. The adhesive is now allowed to cure, for a period of 24 hours and the fishing weight is then ready for use.

Anglers will now appreciate two principal benefits of the invention. First, the invention provides an angling rig having a weight which is non-toxic, unlike lead. And second, this weight appears to fish to be entirely natural (as it is), and therefore catches may be expected to improve in comparison with the use of lead.

A natural stone weight used in any way in which a conventional lead weight may be used In one angling rig that has been found particularly effective (a) the stem of a tulip bead extends through the attachment ring of the weight, (b) the fishing line extends through an anti-tangling tube and the tulip bead, (c) one end of a trace swivel is tied to the line and is inserted in the cup of the tulip bead, (d) a trace with a hook is tied to the other end of the trace swivel and (e) the weight is held in place on the tulip bead by a plain bead friction-fitted over the anti-tangling tube.

Figure 2:
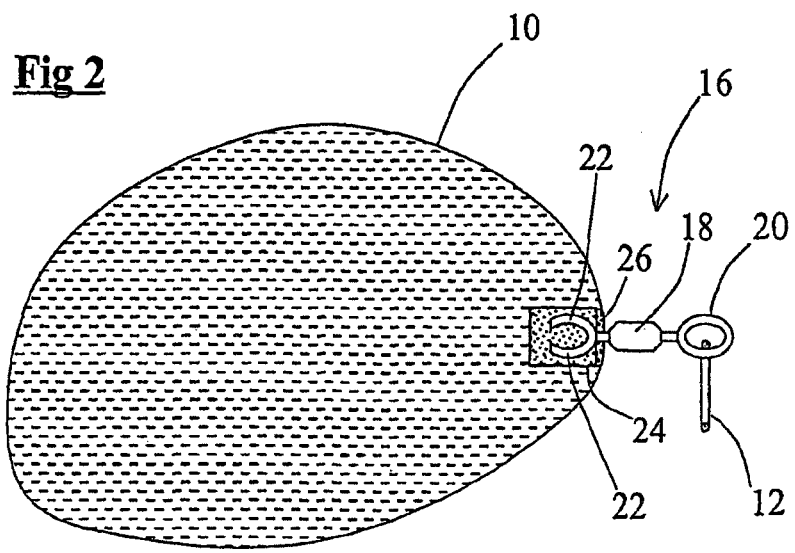
FIG. 2 shows a cross section through the rig of FIG. 1.

Various modifications may be made to the fishing weight of FIGS. 1 and 2. For instance, as an alternative to northern cobbler, a pebble of any dense, hard (but drillable) and non-soluble stone such as granite may be used as an alternative. Also, sand may be sprinkled over the adhesive in the bore 24 before the legs 22 of the swivel 16 are inserted. Whilst FIGS. 1 and 2 the accompanying drawing show the barrel 18 of the swivel 16 located clear of the bore 24, it may otherwise be inserted partially in the bore 24, which may improve the bond but which requires extra care in manufacture to ensure that the swivel continues to provide freedom of movement after the adhesive has cured. Finally, whilst the aforedescribed angling rig is essentially handcrafted and uses a modified form of flexi-ring swivel, it will be understood that the manufacture of the rig may use specially made fittings and be otherwise varied within the scope of the invention.

Referring now to FIG. 3, an alternative form of angling rig shown therein comprises a weight in the form of a natural stone pebble 30 formed with a bore 32. An anti-tangling tube 34 of synthetic plastics material extends through the bore 32 and provides a low-friction passage for a fishing line 36. The tube 34 is retained in the bore 32 by two beads 38 and 40 respectively at opposite ends of the bore 32.

The bead 38 is a simple stop bead of elastomeric material which retains the tube 34 by a friction grip. The bead 40 is a member in the form of a tulip bead, also constructed of elastomeric material, having a stem 40a which grips the tube 34 and is pressed into the bore 32 and a cup 40b arranged relative to the weight 30, spaced from the bore 32, as shown, so as to provide a loosely gripping seat for gripping an attachment element, shown in the form of a trace swivel 42, unencumbered by any engagement of the cup 40b with the weight 30, especially along the bore 32. The line 36 is tied to one end of the swivel 42, to retain the weight 30 at an attachment location on the line 36, against detachment from the line 36, as shown, and a trace 44 (with, in use, a baited hook, not shown) is tied to the other end of the swivel 42.

In use an angler casts or lowers the weight 30 into water over a selected fishing ground with the trace 44 and a hook suitably baited. It sinks to the bottom, where the angler may leave it to await a fish or draw it back towards him, e.g., by use of a fishing reel. Either way, the grip of the beads 38 and 40 on the tube 34 is enough to ensure that the weight 30 stays attached to the line 36, coupled with the line 36 for movement along the line 36, and the grip of the cup 40b on the swivel 42 is enough to ensure that the weight 30 remains coupled at the attachment location and that the trace 44 stays as originally connected. Thus, for instance, the rig remains intact during casting and other manoeuvres.

Further, when a fish takes the bait, the grip of the cup 40b on the swivel 42 is also enough to ensure that the weight 30 serves to drive the hook home in the fish's mouth. However, referring now to FIG. 4, if the line 36 should become entangled in weeds or otherwise snagged, the pull of the fish is enough to overcome the grip of the cup 40b, the swivel 42 is drawn clear, the weight 30 is released for movement along the line 36, away from the attachment location, and the fish can break free unencumbered by the weight 30. Then line 36 is now free to run through the weight 30, the tube 34 providing a substantially friction-free passage for it. However, although the weight 30 is then uncoupled from the cup 40b for movement along the line 36, away from the attachment location, the weight 30 is precluded from being detached from line 36 and remains on the line 36.

Those skilled in the art will appreciate that, instead of the pair of beads 38 and 40, a single bead may be secured on the line (to the right of the weight as viewed in FIGS. 3 and 4) to prevent the weight from sliding down and off the line. With this rig variant, when a fish takes the bait it can run freely, unimpeded by the weight 30, until the angler strikes. And similarly the angler is then unimpeded by the weight in playing the fish.

The embodiments of the invention in which an exclusive property or privilege is claimed are defined as follows:

1. An angling rig comprising a pebble of natural stone and attachment arrangement through which in use a fishing line extends to retain the pebble on the line, wherein the attachment arrangement comprises an attachment ring permanently secured to the pebble by a swivel having first and second retaining parts rotatably connected together by means of a barrel and wherein said second retaining part is fixed in a hole in the pebble, said barrel and said first retaining part are outside the hole, and said first retaining part extends through the attachment ring and thereby retains it.

2. An angling rig as claimed in claim 1 wherein said second retaining part of the swivel is fixed in said hole by a bonding agent.

3. An angling rig as claimed in claim 2 wherein the bonding agent comprises a two-part epoxy resin adhesive which cures to a water-resistant and substantially odourless state.

4. An angling rig as claimed in claim 2 including a layer of sand covering the mouth of the hole and held in place by the bonding agent.

5. An angling rig as claimed in claim 1 wherein the swivel is of size 10 and the hole is of 3 mm diameter.

6. An angling rig as claimed in claim 5 wherein the hole is 5mm deep.

7. An angling rig as claimed in claim 1 wherein the pebble is of the kind known as a northern cobbler.

8. An angling rig as claimed in claim 7 wherein the pebble is 20 mm to 30 mm across.

9. A method of making an angling rig from a natural stone pebble, comprising providing an attachment arrangement comprising a swivel having first and second retaining parts rotatably connected together by means of a barrel and an attachment ring to receive a fishing line extending therethrough, wherein the first retaining part of the swivel extends through the attachment ring and thereby retains it, forming a hole in the pebble to receive the second retaining part of the swivel, and permanently securing the second retaining part of the swivel in the hole with the barrel and the first retaining part of the swivel outside the bore.

10. The method of making an angling rig as claimed in claim 9 wherein the hole is formed by a drill bit having a spear tip of tungsten carbide.

11. The method of making an angling rig as claimed in claim 9 wherein the hole is formed by a core bit.

12. The method of making an angling rig as claimed in claim 10 wherein the drill bit is lubricated while boring the hole.

13. The method of making an angling rig as claimed in claim 11 wherein the drill bit is lubricated while boring the hole.

14. The method of making an angling rig as claimed in claim 10 wherein the drill bit has a working diameter of 3 mm.

15. The method of making an angling rig as claimed in claim 11 wherein the drill bit has a working diameter of 3 mm.

16. The method of making an angling rig as claimed in claim 14 wherein the drill bit is operated at not more than 600 rev/min while forming the hole.

17. The method of making an angling rig as claimed in claim 15 wherein the drill bit is operated at not more than 600 rev/min while forming the hole.

18. An angling rig made by the method of claim 9.

* * * * *